US011785140B2

(12) United States Patent
Mendiratta et al.

(10) Patent No.: US 11,785,140 B2
(45) Date of Patent: Oct. 10, 2023

(54) GESTURE-BASED CALL CENTER AGENT STATE CHANGE CONTROL

(71) Applicant: Avaya Management L.P., Santa Clara, CA (US)

(72) Inventors: Harsh V. Mendiratta, East Brunswick, NJ (US); David Chavez, Broomfield, CO (US); John A. Young, Buntingford (GB)

(73) Assignee: Avaya Management L.P., Santa Clara, CA (US)

( * ) Notice: Subject to any disclaimer, the term of this patent is extended or adjusted under 35 U.S.C. 154(b) by 433 days.

(21) Appl. No.: 17/029,775

(22) Filed: Sep. 23, 2020

(65) Prior Publication Data

US 2022/0094782 A1 Mar. 24, 2022

(51) Int. Cl.
| | |
|---|---|
| *H04M 3/00* | (2006.01) |
| *H04M 3/42* | (2006.01) |
| *G06F 3/01* | (2006.01) |
| *H04M 3/51* | (2006.01) |
| *G06V 40/20* | (2022.01) |
| *G06F 18/21* | (2023.01) |
| *G06F 18/22* | (2023.01) |

(52) U.S. Cl.
CPC ........ *H04M 3/42374* (2013.01); *G06F 3/017* (2013.01); *G06F 18/21* (2023.01); *G06F 18/22* (2023.01); *G06V 40/20* (2022.01); *H04M 3/5183* (2013.01); *H04M 2203/40* (2013.01)

(58) Field of Classification Search
CPC ....................... H04M 3/42374; H04M 3/5183; G06V 40/20; G06F 18/22; G06F 18/21; G06F 3/017
See application file for complete search history.

(56) References Cited

U.S. PATENT DOCUMENTS

| | | | |
|---|---|---|---|
| 8,634,543 B2 | 1/2014 | Flockhart et al. | |
| 8,964,958 B2 | 2/2015 | Steiner | |
| 9,349,118 B2 | 5/2016 | Chavez | |
| 9,634,855 B2 | 4/2017 | Poltorak | |
| 10,181,220 B2 | 1/2019 | Page et al. | |
| 10,757,251 B1 | 8/2020 | Matula et al. | |
| 2010/0235218 A1 | 9/2010 | Erhart et al. | |
| 2011/0125793 A1 | 5/2011 | Erhart et al. | |
| 2011/0125826 A1 | 5/2011 | Erhart et al. | |
| 2020/0301512 A1* | 9/2020 | Davies .................. | G06F 3/0484 |

FOREIGN PATENT DOCUMENTS

CN 101867487 10/2010

OTHER PUBLICATIONS

Official Action for India Patent Application No. 202114041684, dated Apr. 26, 2022 7 pages.

* cited by examiner

*Primary Examiner* — Rasha S Al Aubaidi
(74) *Attorney, Agent, or Firm* — Sheridan Ross P.C.

(57) ABSTRACT

Users of a networked communication device may omit updating their availability state, and that of an associated communication device, if the state change is sudden or believed to be of sufficiently short duration. By quickly changing their state, a routing component may more accurately know whether or not a communication routed to the communication device will or will not be answered. By utilizing a camera and gesture processing logic, a user may naturally and quickly update their state without the need to navigate menus or select options with manual, tactile interactions with the communication device.

20 Claims, 7 Drawing Sheets

GESTURE-BASED CALL CENTER AGENT STATE CHANGE CONTROL

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for machine inputs and particularly to contactless state change of a node on a network.

BACKGROUND

Does it sound familiar that you call a contact center, go through interactive voice response (IVR) trees, pick a correct option in the IVR menu tree, but, in the end, the phone keeps ringing? It is not that the call is misrouted; instead, it is likely that the agent is not at his desk or decided to not answer the call. Most of the contact center services take the agent state as one of the key criteria to route the customer calls to the best "available" agent, but who determines that the "available" agent is really available to take the call?

As for the contact center routing logic, if the state of an agent is marked available, the incoming calls can be routed to that agent. Period! When an agent walks away from his desk or is in personal call/text, he is supposed to change the state (e.g., AUX mode); so that, the routing logic stops delivering calls to that agent while he is not in a position to take the calls. The reality is that the state change is not done consistently. The likelihood of the issue (of not changing the state consistently) gets magnified when the agent is working from home. Such incidences lead to customer frustration, repeat calls, longer queues/IVR, lost revenues, damage to a company's brand, and deteriorating loyalty.

SUMMARY

These and other needs are addressed by the various embodiments and configurations of the present invention. The present invention can provide a number of advantages depending on the particular configuration. These and other advantages will be apparent from the disclosure of the invention(s) contained herein.

As a general introduction, and in one embodiment, providing an easy way to change an agent's state incents the agents to do so, thereby providing greater accuracy in knowing which agents are actually availability to accept a communication.

In the embodiments herein, systems and methods are provided for a frictionless mechanism to convey/change agent state. Instead of relying on a clunky pull-down menu to change the agent's state, the proposal relies on gesticulation by the agent to indicate the state changes. The gestures in the form of video will be continuously picked by a camera, such as one attached to or integrated into a PC/laptop, and fed to an Agent State Monitor Engine (ASME). The ASME is an AI-enabled non-intrusive engine responsible for converting the agent's intent for the state change and to feed the state change into the call center routing logic. The video feed may be provided to a human for review or evaluation of the machine-executed processes and/or machine-made decisions only, otherwise the video feed is not provided to any human; instead, the video is consumed solely by the electronic systems and components described herein, such as systems and/or components executing the AI engine in order to understand agent's intention. With the camera being on a continuous lookout for the agent gestures, ASME will pick the gesture instantaneously and feed the intent to make quick and frequent updates of the agent state in the call center routing logic, thereby keeping the routing logic up-to-date at all times.

For example, an agent comes to his desk and is ready to take calls. He shows a sign of thumbs-up. This gesture will be picked up by the ASME, which will interpret the thumbs-up sign as the agent's intent to change the state to AVAILABLE. Here, rather than the agent going to the screen and manually changing the state to AVAILABLE, the ASME can understand the intent and may change the Agent State to AVAILABLE. As soon as this is done, the call center routing logic can include this agent in the pool of the available agents and can route the calls to the agent.

Continuing the example, when the agent needs to move away or simply do some non-call related chore (e.g., going on a personal phone call or chat, answering a question from a coworker standing next to the agent, greeting a supervisor, etc.), he will simply show the thumbs-down sign, which the ASME will identify as the agent's intent to change the agent state to indicate non-availability, such as an AUX mode. If the agent forgets to use gesture and simply walks away from the desk, the ASME will treat the absence of the agent to automatically change the agent state to AUX. When the agent comes back and settles in his desk, he can simply show a thumbs-up sign again to change his state back to AVAILABLE.

If the agent forgets to show thumbs-up sign after coming back, the ASME can remind the agent that he is in AUX mode—not AVAILABLE. As soon as the agent shows the thumbs-up sign, the ASME will change the state to AVAILABLE.

In the above example, the thumbs-up and thumbs-down gestures are for illustration purposes only. An administrator or the agent will be allowed to pick gestures for specific state change. The solution can provide a library of standard hand gestures along with an option for the agent or administrator to define custom gestures.

In another embodiment, voice and/or facial authentication can be added/invoked by ASME. The agent will not have to log in to his machine in order to change state as the ASME, may be configured to log the agent in as AVAILABLE upon being recognized by speech and/or face and/or providing speech and/or gesture to indicate they are AVAILABLE.

Security assurance can be added to this application by accepting the gesture only from a particular agent. In other words, ASME can perform a face match before accepting gestures and making changes to the agent state. Face match can help avoid unintentional and/or malicious state changes. For instance, a passerby could show a thumbs-up/thumbs-down sign to the agent's camera for whatever reason. If ASME interprets it as the agent's intent, it could lead to wrongful state change. Therefore, in another embodiment, the ASME would simply ignore a passerby's gesture and only accept gestures from the recognized agent.

In another embodiment, a training dataset is provided for initial training of the AI. The training data may comprising of a sufficient number of images, capturing varying gestures and outcome. The images will cover the subject from different angles and in different lighting conditions. This dataset will be used to create the initial model. As a portion of the initial model or as a second stage of training, known non-gestures (e.g., movements that the AI should not recognize as gesture associated with a state change) are provided to the AI to avoid mistaken identification of movements as state-change indicating gestures.

In another embodiment, training may be refined by an agent's manually training inputs for training of the AI and/or the agent. For example, the agent may use different gestures for intended states. The application will have videos/animation to guide the user on the usage of the gestures for changing the agent-state. For instance, it will show the user how particular gestures will lead to specific agent-state changes. After the video, the agent will undergo a training exercise, where the agent will be prompted to display a gesture and application will interpret and share the result with the agent. The agent will then be prompted to confirm whether the application captured the intent correctly or not. Apart from acquainting the user with the new capability, this manual training exercise will produce a dynamic dataset that will augment the static dataset that may be initially provided to the AI. The total dataset will provide enhanced modeling for the agent. The application will continue to evolve the model over time for better accuracy in identifying the gestures. Similarly, the agent may be asked to perform a gesture and the AI respond with the determined intention of the gestures. The agent's response indicating the correctness, or lack thereof, of the determined intention then provided back to the AI as a source of subsequent training images.

Exemplary aspects are directed to:

A system, comprising:
a processor configured with machine-readable instructions maintained in a non-transitory storage;
a camera; and
a network interface to a network; and
wherein the processor performs:
  receiving a first image from the camera;
  evaluating the first image to determine whether the first image comprises a state update gesture made by a user;
  upon determine the first image comprises the state update gesture, providing a component, via the network, with a state of the system associated with the state update gesture to cause the system to selectively be excluded or included from receiving communications, comprising exclusion when the state is associated with unavailability or inclusion when the state is associated with availability.

A method, comprising:
receiving a first image of a user from a camera;
evaluating the first image to determine whether the first image comprises a state update gesture made by the user;
upon determine the first image comprises the state update gesture, providing a component with a state of the user associated with the state update gesture; and
upon determining the state update gestures is associated with unavailability of the user, suspend a communication device associated with the user from being connected any of a number of customer devices; and
upon determining the state update gestures is associated with availability of the user, enabling the communication device associated with the user to be connected to one of the number of customer devices, via a network, to conduct a communication with a customer associated with the one of the number of customer devices.

A communication device, comprising:
a processor configured with machine-readable instructions maintained in a non-transitory storage;
a camera; and
a network interface to a network; and
wherein the processor performs:
  receiving a first image from the camera;
  evaluating the first image to determine whether the first image comprises a state update gesture made by a user;
  upon determine the first image comprises the state update gesture, setting a state of the communication device associated with the state update gesture to cause the communication device to identified as unavailable and selectively refuse a communication request or cause the communication device to be identified as available and accept the communication request.

Any of the above aspects, wherein the processor performs the evaluating the first image to determine whether the first image comprises the state update gesture made by the user, further comprising:
  determining whether the first image comprises a state update gesture made by another party different from the user; and
  upon determining the state update gesture was made by another party, omitting providing the component with the state of the system.

Any of the above aspects, wherein the processor performs the evaluating of the first image to determine whether the first image comprises the state update gestures, further comprising:
  providing the first image to a neural network trained with at least one set of state update gestures; and
  wherein the neural network determines the first image comprises a state update gesture upon determining the first image being determined to be more likely than not to match a threshold first image attribute learned from the at least one set of state update gestures.

Any of the above aspects, wherein the neural network is trained with a second training set comprising the first training set and a set of non-state update gestures incorrectly identified as state update gestures during training the at least one set of state update gestures.

Any of the above aspects, further comprising the processor performing:
  upon determine the first image comprises the state update gesture, further determining a type of state update gesture therefrom;
  upon determining the type of state update gesture is an availability type, providing the component with the state further comprising an available state; and
  upon determining the type of state update gesture is an unavailability type, providing the component with the state further comprising an unavailable state.

Any of the above aspects, further comprising:
an output component; and
wherein the processor further performs:
  receiving, at a subsequent time to the first image, a second image and wherein the processor previously determined the type of state update gesture associated with the first image is the availability type;
  determining whether an erroneous state is present comprising, determining whether the second image comprises at least one of (a) a number of gestures associated with unavailability or (b) a number of gestures, none of which are associated with availability; and presenting indicia of the erroneous state on the output.

Any of the above aspects, further comprising:

an output component; and wherein the processor further performs:

receiving, at a subsequent time to the first image, a second image and wherein the processor previously determined the type of state update gesture associated with the first image is the unavailability type;

determining whether an erroneous state is present comprising, determining whether the second image comprises at least one of (a) a number of gestures associated with availability or (b) a number of gestures, none of which are associated with unavailability; and presenting indicia of the erroneous state on the output.

Any of the above aspects, wherein the processor further performs:

receiving a second image from the camera, wherein receiving the second image occurs while the system is currently engaged in the communication;

evaluating the second image to determine whether the second image comprises a second state update gesture associated with unavailability; and upon determining the second image does comprise the second state update gesture associated with unavailability, perform a suspension action comprising one or more of muting audio provided by the system as a portion of the communication, suspending a video image provided by the system as a portion of the communication, or terminating the communication.

Any of the above aspects, wherein the processor further performs:

receiving a third image from the camera, wherein receiving the third image occurs while the system is currently engaged in the communication while performing the suspension action;

evaluating the third image to determine whether the second image comprises a third state update gesture associated with availability; and upon determining the second image does comprise the second state update gesture associated with availability, perform a resumption action comprising one or more of unmuting audio provided by the system as the portion of the communication and resuming the video image provided by the system as the portion of the communication.

Any of the above aspects, wherein the processor further performs:

causing the system to selectively be excluded from receiving communications when the state is associated with unavailability, further comprising, declining the communication presented by the system to be answered; and causing the system to selectively be included to receive communications when the state is associated with availability, further comprising, answering the communication presented by the system to be answered.

Any of the above aspects, further comprising:

providing the first image to a neural network trained with at least one set of state update gestures; and wherein the neural network determines the first image comprises a state update gesture upon determining the first image being determined to be more likely than not to match a threshold first image attribute learned from the at least one set of state update gestures.

Any of the above aspects, wherein the neural network is trained with a second training set comprising the first training set and a set of non-state update gestures incorrectly identified as state update gestures during training the at least one set of state update gestures.

Any of the above aspects, further comprising:

upon determine the first image comprises the state update gesture, further determining a type of state update gesture therefrom;

upon determining the type of state update gesture is an availability type, providing the component with the state further comprising an available state; and upon determining the type of state update gesture is an unavailability type, providing the component with the state further comprising an unavailable state.

Any of the above aspects, further comprising:

receiving a second image from the camera, wherein receiving the second image occurs while the system is currently engaged in the communication;

evaluating the second image to determine whether the second image comprises a second state update gesture associated with unavailability; and upon determining the second image does comprise the second state update gesture associated with unavailability, perform a suspension action comprising one or more of muting audio provided by the system as a portion of the communication, suspending a video image provided by the system as a portion of the communication, or terminating the communication.

Any of the above aspects, wherein the processor further performs:

receiving a third image from the camera, wherein receiving the third image occurs while the system is currently engaged in the communication while performing the suspension action;

evaluating the third image to determine whether the second image comprises a third state update gesture associated with availability; and upon determining the second image does comprise the second state update gesture associated with availability, perform a resumption action comprising one or more of unmuting audio provided by the system as the portion of the communication and resuming the video image provided by the system as the portion of the communication.

Any of the above aspects, further comprising:

causing the system to selectively be excluded from receiving communications when the state is associated with unavailability, further comprising, declining the communication presented by the system to be answered; and causing the system to selectively be included to receive communications when the state is associated with availability, further comprising, answering the communication presented by the system to be answered.

Any of the above aspects, wherein the processor performs the evaluating of the first image to determine whether the first image comprises the state update gestures, further comprising:

providing the first image to a neural network trained with at least one set of state update gestures; and wherein the neural network determines the first image comprises a state update gesture upon determining the first image being determined to be more likely than not to match a threshold first image attribute learned from the at least one set of state update gestures.

Any of the above aspects, wherein the neural network is trained with a second training set comprising the first training set and a set of non-state update gestures incorrectly identified as state update gestures during training the at least one set of state update gestures.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
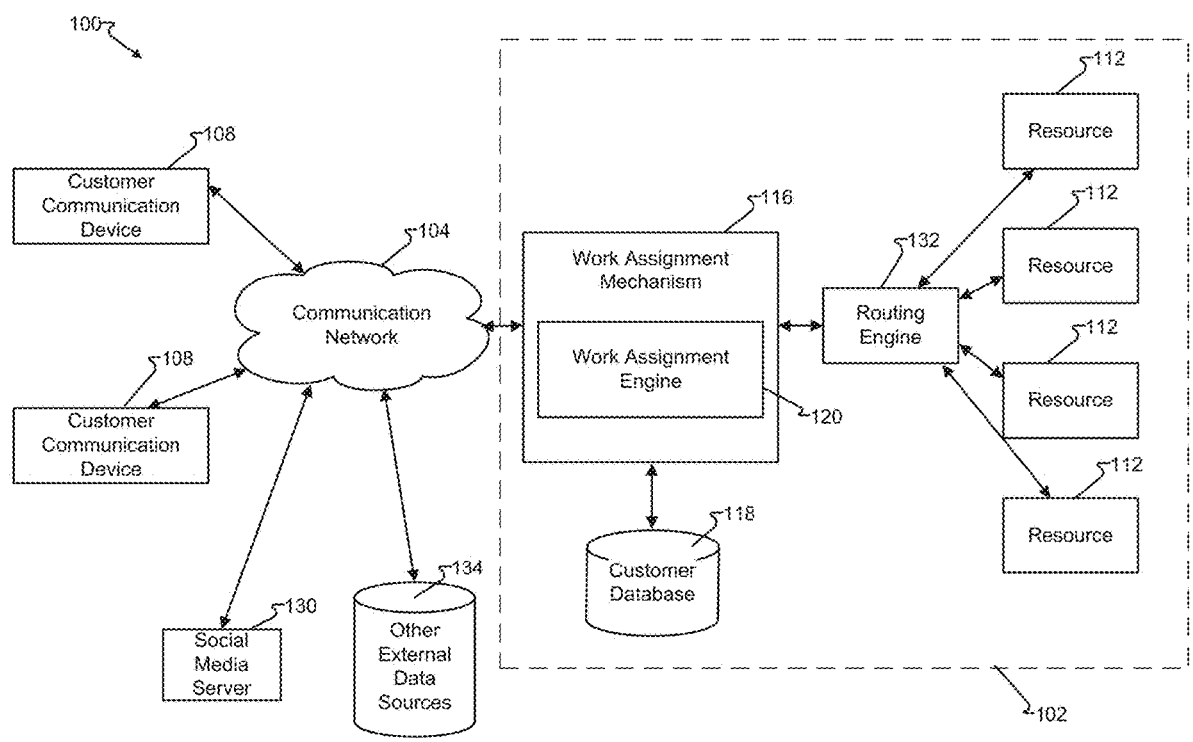
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. While in certain embodiments, resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102, as used herein, embodiments of resource 112 are solely limited to a human agent utilizing an agent communication device (e.g., computer, smart phone, etc.) to communicate with other nodes via, at least, communication network 104. The agent communication device comprising a network interface to enable the agent communication device to communicate with other notes (e.g., other resources 112 and/or customer communication device 108) and one or more input-output components, such as a speaker, microphone, camera, display, keyboard, mouse, and/or variants thereof. Furthermore, the use of the terms "user" or "agent" hereinafter shall refer to the human user of the agent communication device and may be used interchangeably.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
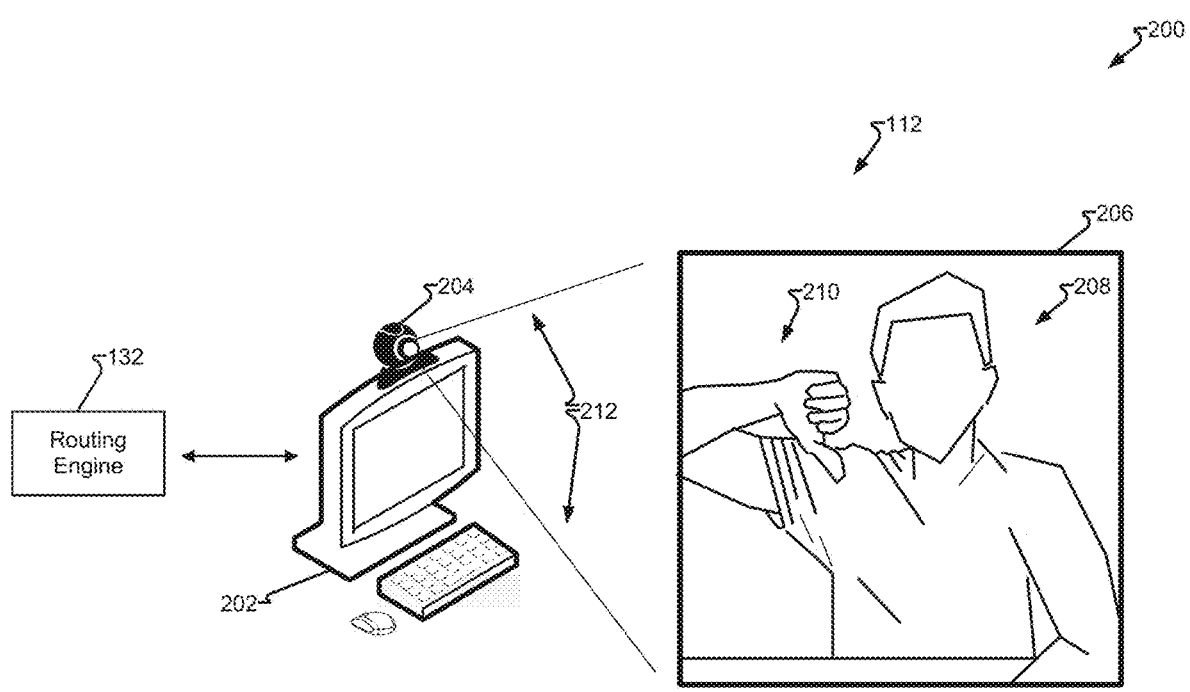
FIG. 2 depicts a first operation of the system in accordance with embodiments of the present disclosure.

FIG. 2 depicts operation 200 of the system in accordance with embodiments of the present disclosure. In one embodiment, resource 112 is embodied as agent communication device 202 and agent 208 (as illustrated in captured image 206). Routing engine 132 and/or other component of contact center 102 has received a communication from customer communication device 108 utilized by a customer. The initial communication may be held by a component of contact center 102 (other than agent communication device 202) or currently undergoing interaction with an interactive voice response or other automated resource to be connected to an agent (e.g., agent 208). Alternatively, routing engine 132 may have initiated an outbound call with customer communication device 108 to be connected to one of a number of resource 112 upon being answered by an associated customer utilizing customer communication device 108.

In the prior art, an agent may indicate their availability, or lack thereof, by selecting a particular icon, menu item, or other user input presented on a display of agent communication device 202. However, when the change in state is immediate, such as agent 208 is about to sneeze, cough, or is working from home and needs to address an immediate issue, agent 208 may be reluctant or unable to take the steps to perform such an action due to the complexity or the time required to provide such an input and to suspend agent communication device 202 from being considered and/or connected to any communications until the state is changed back to being available. Accordingly, camera 204 attached or integrated into agent communication device 202 monitors agent 208 within camera field of view 212. Upon determining agent 208 is providing unavailable gesture 210, agent communication device 202 is placed into an UNAVAILABLE state, such as by providing a notice of unavailability to routing engine 132 and/or other component of routing engine 132. While agent communication device 202 is in the UNAVAILABLE state, agent communication device 202 will not receive any further communications from customer communication device 108 as directed by routing engine 132 or other component of contact center 102.

In another embodiment, agent communication device 202 may be presently engaged in a communication with customer communication device 108 and, upon receiving unavailable gesture 210 and placing agent communication device 202 in an UNAVAILABLE state, the communication may be altered, for example, sound may be captured by a microphone (not shown) providing speech from agent 208 into the communication may be discontinued (e.g., muted) at the microphone, agent communication device 202, or other component to prevent sound captured by agent communication device 202 from being provided to customer communication device 108. As a further option, a generated or previously recorded audio message may be provided to customer communication device 108 (e.g., "Please stand by while we reconnect you to the agent.") Similarly, in another embodiment, if camera 204 is providing video content to customer communication device 108, the image may be discontinued from being provided to customer communication device 108. As a further option, a generated or previously recorded still or video image may be provided, such as a graphic indicating that the video does not presently include the agent but to stand by and the video will continue as soon as possible. Optionally, and in yet another embodiment, the communication may be terminated (e.g., dropped, requeued for a different agent and associated agent communication device, etc.). Additionally or alternatively, unavailable gesture 210 may notify a queue management component, such as work assignment mechanism 116, work assignment engine 120, and/or routing engine 132 to that agent 208 is unavailable for a subsequent call. As a result, the current call may complete but no further calls routed to agent communication device 202. Accordingly, calls enqueued specifically for agent 110 may be requeued to a different agent. Once agent 210 indicates availability, such as by available gesture 302 (see FIG. 3) or by other means (e.g., menu option, setting, etc.), the queue management component will again route calls to agent 208 via agent communication device 202.

In another embodiment, agent 208 may act inconsistently with a current state of agent communication device 202. For example, agent communication device 202 may be currently AVAILABLE, but agent 208 is absent from camera field of view 212 of camera 204. Accordingly, agent communication device 202 may be automatically placed in an UNAVAILABLE state. Optionally, an audible or visual notification may be presented, such as to notify agent 208 of the state upon their return or to indicate an error. For example, camera 204 or another component or connection may have a fault and agent 208 is physically present but due to a fault, not shown or detected in captured image 206. Accordingly, agent 208 may override and/or disable automatic gesture detection.

Figure 3:
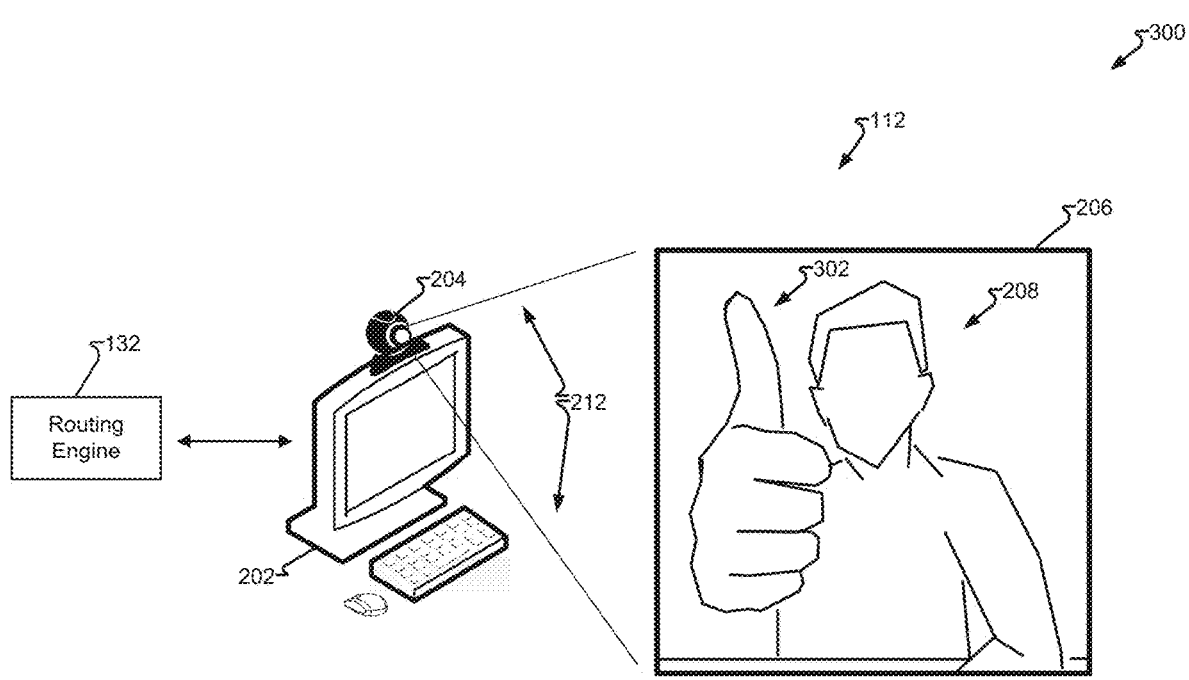
FIG. 3 depicts a second operation of the system in accordance with embodiments of the present disclosure.

FIG. 3 depicts operation 300 of the system in accordance with embodiments of the present disclosure. Similar to operation 200, camera 204 captures captured image 206 within camera field of view 212 including agent 208 making available gesture 302.

Routing engine 132 and/or other component of contact center 102 has received a communication from customer communication device 108 utilized by a customer. Agent communication device 202, prior to receiving captured image 206 comprising available gesture 302, has an UNAVAILABLE state and communications from any customer communication device 108 are communication devices associated with other agents or held in-queue. Upon agent communication device 202 receiving available gesture 302, notification is provided to routing engine 132 and/or other component of contact center 102 to indicate that agent communication device 202 is AVAILABLE to accept communications and, upon a suitable communication being determined, the communication is routed to agent communication device 202 for connection thereby for a communication between agent 208 and a customer utilizing customer communication device 108.

In another embodiment, agent communication device 202 may be presently engaged in a communication with customer communication device 108 that has been placed on hold, for example, audio and/or video originating from agent communication device 202 are not provided to customer communication device 108. Accordingly, after the state changes to AVAILABLE, audio and/or video from agent communication device 202 are resumed.

In another embodiment, agent 208 may act inconsistently with a current state of agent communication device 202. For example, agent communication device 202 may be currently UNAVAILABLE, but agent 208 appears to be waiting for a communication but none are forthcoming. For example, agent 208 may roll up their palms, a motion that may be associated with confusion or uncertainty. In response, camera 204 and agent communication device 202 may determine such a gesture is an inquiry as to the current state of agent communication device 202 and provide a visual and/or audible response (e.g., "Current state is UNAVAILALBE. Change to AVAILABLE?"). Agent 208 may then provide unavailable gesture 210 and agent communication device 202 then changes to AVAILABLE.

absent from camera field of view 212 of camera 204. Accordingly, agent communication device 202 may be automatically placed in an UNAVAILABLE state. Optionally, an audible or visual notification may be presented, such as to notify agent 208 of the state upon their return or to indicate an error. For example, camera 204 or another component or connection may have a fault and agent 208 is physically present but due to a fault, not shown or detected in captured image 206. Accordingly, agent 208 may override and/or disable automatic gesture detection.

In another embodiment, a minimum threshold time may be required for unavailable gesture 210 and/or available gesture 302 to cause the state change. The minimum time is preferable short (e.g., less than one second) but may be increased, such as if agent communication device 202 is incorrectly identifying non-gestures as state change gestures. Additionally or alternatively, a neural network associated with agent communication device 202 may be trained, such as by agent 208 providing an indication that a non-gestures, which has been incorrectly identified as a gesture, was in error.

Figure 4:
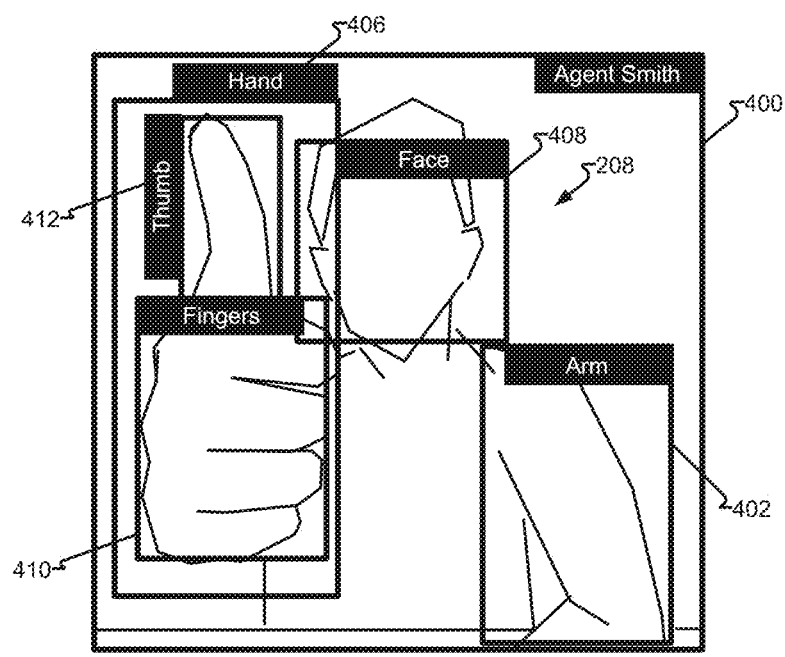
FIG. 4 depicts an analysis of an image frame in accordance with embodiments of the present disclosure.

FIG. 4 depicts analysis of image frame 400 in accordance with embodiments of the present disclosure. In one embodiment, image frame 400 is captured by camera 204. One or more image segments may be identified, such as executing a line-detection or other object detecting process executed by a processor. For example, image frame 400 may be known to comprise a particular agent (e.g., "Agent Smith") or determined to comprise the particular agent 208 via facial recognition. Image segments may comprise arm portion 402, face portion 408, thumb portion 412, fingers portion 410, and/or other portions. The particular position of any one image portion may be gesture-indicating when relative to another image portion. For example, hand portion 406 may comprise thumb portion 412 that is above (e.g., closer to the top of image frame 400 than fingers portion 410) fingers portion 410 the gesture is determined to be a "thumbs-up", which may be a gesture associated with availability. In contrast, if thumb portion 412 is below (e.g., closer to the bottom of image frame 400 than fingers portion 410) fingers portion 410 the gesture would be determined to be a "thumbs-down," which may be a gesture associated with unavailability.

While image frame 400 may provide a single frame of a video image determined to comprise a state update gesture. In another embodiment, multiple frames are analyzed to determine whether the gesture is embodied in the motion of agent 208 and, therefore, within a number of video frames. For example, agent 208 may make a slashing motion across the agent's neck—associated with "cut" or, as may be used herein, a gesture associated with unavailability. In another example, agent 208 may hold their hand or finger roughly flat and make a rolling motion—associated with action or proceeding or, as may be used herein, a gesture associated with availability.

Figure 5:
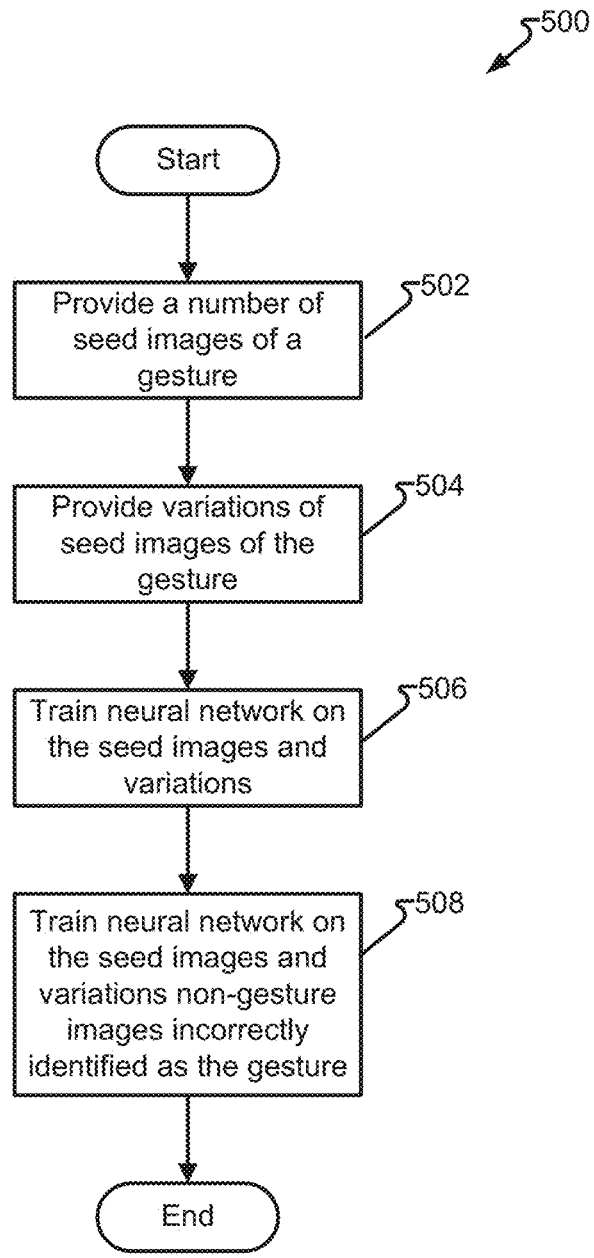
FIG. 5 depicts a first process in accordance with embodiments of the present disclosure.

FIG. 5 depicts process 500 in accordance with embodiments of the present disclosure. Humans are imprecise mechanism to reproduce a gesture, whether the gesture is substantially stationary (e.g., a "thumbs-up" or "thumbs-down") or animated (e.g., a throat-slash motion or a "roll" motion). As an exact match to a previously determined state-indicating gesture is unlikely to be produced, a substantial match of a current gesture to corpus or model of a gesture is provided, such as via evaluation by a trained neural network.

A neural network is provided, such as one or more processes embodied as machine-readable instructions maintained in a non-transitory memory and executed by a processor(s) of agent communication device 202 and/or other processing device(s) in communication with agent communication device 202. The neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

By way of example, a first layer of nodes may evaluate an image for edges, where an edge is detected, the nodes provide an input to a next layer of nodes. The next layer of nodes may look for textures such as to delineate a wall from a body part. Again, the nodes that find a target texture are active and provide an input to a next layer of nodes which may then look for particular shapes or other features. The process continues until a conclusion is reached that a state update gesture is, or is not, provided within an image(s). As a further embodiment, a particular state update gesture may be determined (e.g., a thumbs-up or a thumbs-down).

Accordingly, and in one embodiment, step 502 provides a number of seed images of a gesture to a neural network. For example, a particular "available" gesture or a particular "UNAVAILABLE" gesture. The seed images may be provided by agent 208, who will then provide the gestures to indicate a change in state, and/or other people. Step 504 provides a number of variations on the gestures. The variations may include one or more of acceptable ranges of a position relative to an absolute value (e.g., a thumb must be pointed upward within forty-five degrees of vertical to be a "thumbs-up" gesture) or a relative value, such as the degree of bend in a joint of a human body part (e.g., the degree to which a thumb may be bent and still convey "thumbs-up"). Similarly, animated gestures may be provided with variations (e.g., how big the rolling gesture is). With the seed images and variations of the seed images, step 506 performs a first training action on the neural network.

As a result of the step 506 one or more images may incorrectly identify body positions or motions as state-indicating gestures. Accordingly, step 508 provides a second training step comprising the seed images from step 502, the variations provided in step 504, and a number of non-state gestures that were incorrectly identified as state update gestures in step 506.

If currently determined gesture is associated with a current state of agent communication device 202, (e.g., the gesture is associated with "available" while agent communication device 202 is currently has an "available" state) the gesture may be ignored and/or confirmed. If the currently determined gesture is different from the current state of agent communication device 202 (e.g., the gesture is associated with "available" while agent communication device 202 is currently has an "UNAVAILABLE" state) the gesture is a state update gesture. Optionally, a tone or other audible indication may be provided, such as by a speaker associated with agent communication device 202, and/or a visual indication presented on a display associated with agent communication device 202 is provided to indicate a current state and/or a change in the state, upon receiving a gesture.

Figure 6:
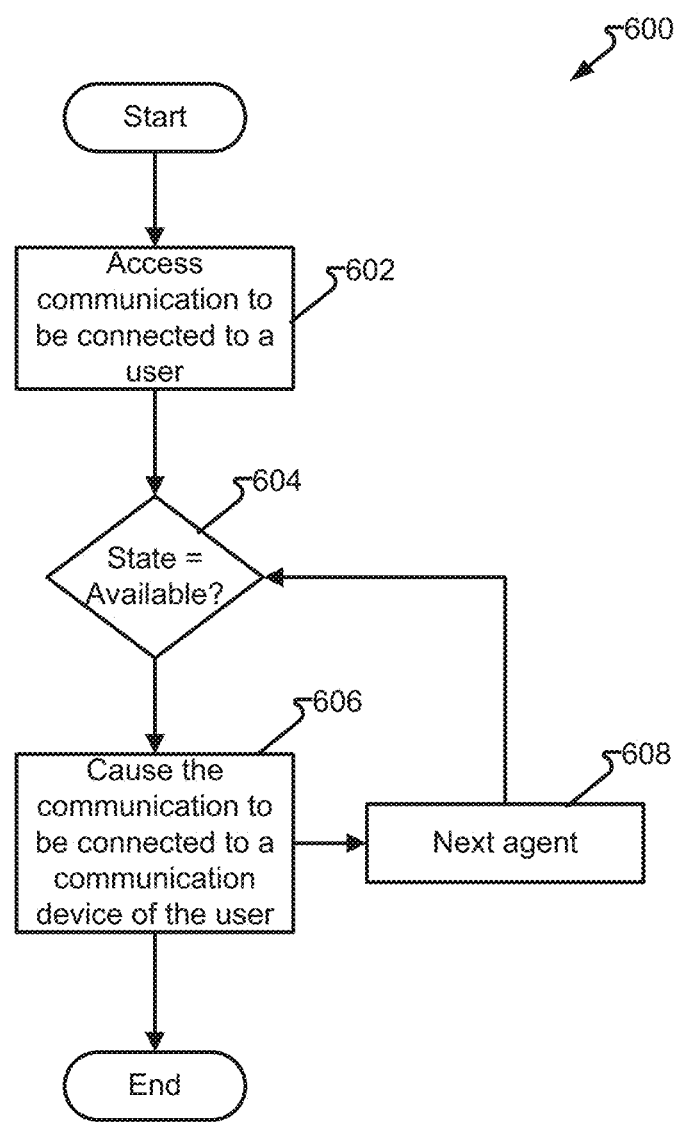
FIG. 6 depicts a second process in accordance with embodiments of the present disclosure.

FIG. 6 depicts process 600 in accordance with embodiments of the present disclosure. Process 600 may be embodied as machine-readable instructions that, when read by a processor from a non-transitory memory, cause the processor to perform the steps of process 600, such as a processor of, or accessible to, work assignment mechanism 116, work assignment engine 120, routing engine 132, and/or agent communication device 202.

Process 600 may be implemented following training of a neural network (see process 500). Step 602 accesses a communication to be connected to one of a number of resource 112, one of which comprises agent communication device 202 associated with agent 208. The communication may originate from customer communication device 108 (i.e., inbound) or from a component of contact center 102 (other than any resource 112) to customer communication device 108. Next, test 604 determines if a state is AVAILABLE and, if yes, connects the communication to the communication device in step 606. If test 604 is determined in the negative, the next agent (and associated agent communication device) is selected in step 608 and processing continues back to test 604 until an available agent (and associated agent communication device) has a state of AVAILABLE. If none are found, the communication may be held in-queue until such time that the call can be connected to an available agent.

Figure 7:
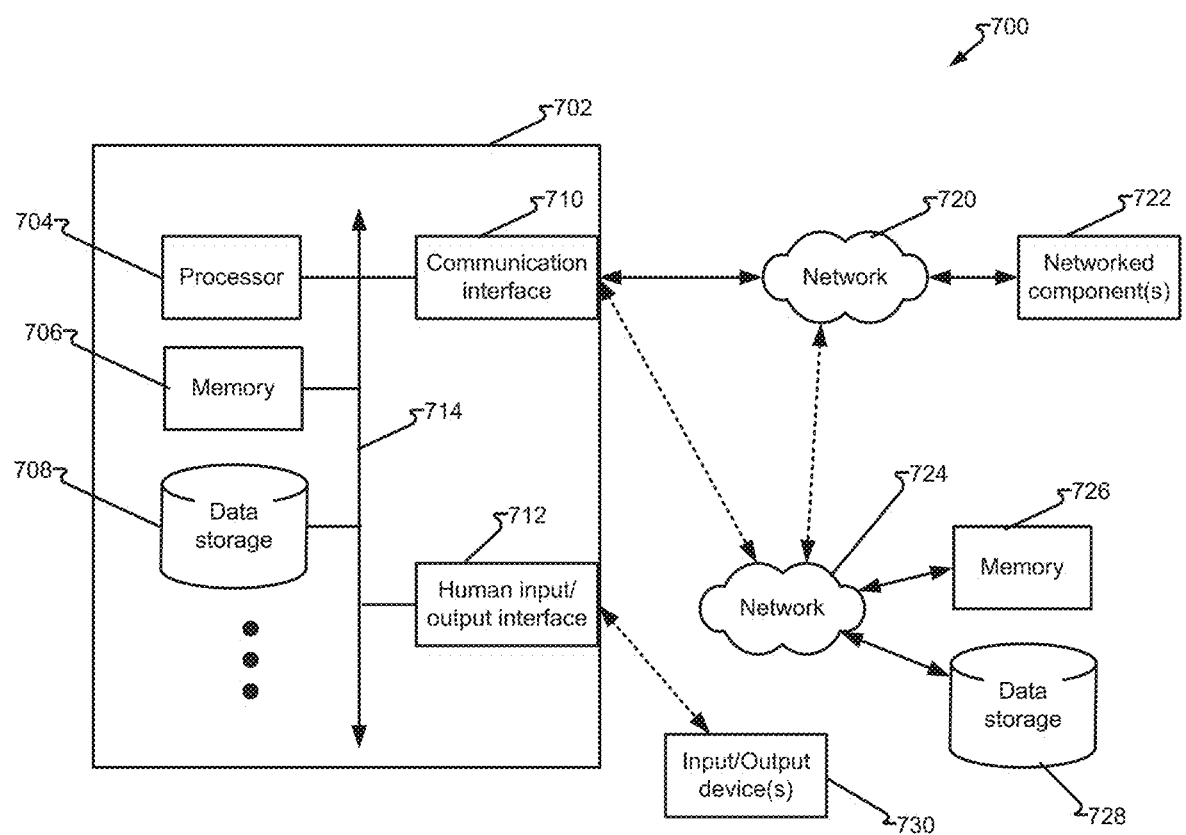
FIG. 7 depicts a second system in accordance with embodiments of the present disclosure.

FIG. 7 depicts device 702 in system 700 in accordance with embodiments of the present disclosure. In one embodiment, agent communication device 202 may be embodied, in whole or in part, as device 702 comprising various components and connections to other components and/or systems. The components are variously embodied and may comprise processor 704. Processor 704 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 704) and the hardware and other circuitry thereof.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, etc. In another embodiment, communication interface 710 may comprise, or be comprised by, human input/output interface 712. Communication interface 710 may be configured to communicate directly with a networked component or utilize one or more networks, such as network 720 and/or network 724.

Network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with network component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112 (e.g., agent communication device 202). Similarly, one particular networked component 722 and/or resource 112 may be enabled (or disabled) from communicating with a particular other networked component 722 and/or resource 112, including, in certain embodiments, device 702 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a processor configured with machine-readable instructions maintained in a non-transitory storage;
    a camera; and
    a network interface to a network; and
    wherein the processor performs:
        receiving a first image from the camera;
        evaluating the first image to determine whether the first image comprises a state update gesture made by a user; and
        upon determining that the first image comprises the state update gesture, providing a component, via the network, with a state of the system associated with the state update gesture to cause the system to selectively be excluded or included from receiving communications, comprising exclusion when the state is associated with unavailability or inclusion when the state is associated with availability.

2. The system of claim 1, wherein the processor performs the evaluating the first image to determine whether the first image comprises the state update gesture made by the user, further comprising:
    determining whether the first image comprises a state update gesture made by another party different from the user; and
    upon determining that the state update gesture was made by another party, omitting providing the component with the state of the system.

3. The system of claim 1, wherein the processor performs the evaluating of the first image to determine whether the first image comprises the state update gestures, further comprising:
    providing the first image to a neural network trained with a first training set comprising at least one set of state update gestures; and
    wherein the neural network determines the first image comprises a state update gesture upon determining that the first image being determined to be more likely than not to match a threshold first image attribute learned from the at least one set of state update gestures.

4. The system of claim 3, wherein the neural network is trained with a second training set comprising the first training set and a set of non-state update gestures incorrectly identified as state update gestures during training the at least one set of state update gestures.

5. The system of claim 1, further comprising the processor performing:
    upon determining that the first image comprises the state update gesture, further determining a type of state update gesture therefrom;
    upon determining that the type of state update gesture is an availability type, providing the component with the state further comprising an available state; and
    upon determining that the type of state update gesture is an unavailability type, providing the component with the state further comprising an unavailable state.

6. The system of claim 5, further comprising:
    an output component; and
    wherein the processor further performs:
        receiving, at a subsequent time to the first image, a second image and wherein the processor previously determined the type of state update gesture associated with the first image is the availability type;
        determining whether an erroneous state is present comprising, determining whether the second image comprises at least one of (a) a number of gestures associated with unavailability or (b) a number of gestures, none of which are associated with availability; and
        presenting indicia of the erroneous state on an output.

7. The system of claim 5, further comprising:
    an output component; and
    wherein the processor further performs:
        receiving, at a subsequent time to the first image, a second image and wherein the processor previously determined the type of state update gesture associated with the first image is the unavailability type;
        determining whether an erroneous state is present comprising, determining whether the second image comprises at least one of (a) a number of gestures associated with availability or (b) a number of gestures, none of which are associated with unavailability; and presenting indicia of the erroneous state on an output.

8. The system of claim 1, wherein the processor further performs:

receiving a second image from the camera, wherein receiving the second image occurs while the system is currently engaged in a communication;

evaluating the second image to determine whether the second image comprises a second state update gesture associated with unavailability; and upon determining that the second image does comprise the second state update gesture associated with unavailability, perform a suspension action comprising one or more of muting audio provided by the system as a portion of the communication, suspending a video image provided by the system as a portion of the communication, or terminating the communication.

9. The system of claim 8, wherein the processor further performs:

receiving a third image from the camera, wherein receiving the third image occurs while the system is currently engaged in the communication while performing the suspension action;

evaluating the third image to determine whether the second image comprises a third state update gesture associated with availability; and upon determining that the second image does comprise the second state update gesture associated with availability, perform a resumption action comprising one or more of unmuting audio provided by the system as the portion of the communication and resuming the video image provided by the system as the portion of the communication.

10. The system of claim 1, wherein the processor further performs:

causing the system to selectively be excluded from receiving communications when the state is associated with unavailability, further comprising, declining the communication presented by the system to be answered; and causing the system to selectively be included to receive communications when the state is associated with availability, further comprising, answering the communication presented by the system to be answered.

11. A method, comprising:

receiving a first image of a user from a camera;

evaluating the first image to determine whether the first image comprises a state update gesture made by the user;

upon determining that the first image comprises the state update gesture, providing a component with a state of the user associated with the state update gesture;

upon determining that the state update gestures is associated with unavailability of the user, suspend a communication device associated with the user from being connected any of a number of customer devices; and upon determining that the state update gestures is associated with availability of the user, enabling the communication device associated with the user to be connected to one of the number of customer devices, via a network, to conduct a communication with a customer associated with the one of the number of customer devices.

12. The method of claim 11, further comprising:

providing the first image to a neural network trained with a first training set comprising at least one set of state update gestures; and wherein the neural network determines the first image comprises a state update gesture upon determining the first image being determined to be more likely than not to match a threshold first image attribute learned from the at least one set of state update gestures.

13. The method of claim 12, wherein the neural network is trained with a second training set comprising the first training set and a set of non-state update gestures incorrectly identified as state update gestures during training the at least one set of state update gestures.

14. The method of claim 11, further comprising:

upon determining that the first image comprises the state update gesture, further determining a type of state update gesture therefrom;

upon determining that the type of state update gesture is an availability type, providing the component with the state further comprising an available state; and upon determining that the type of state update gesture is an unavailability type, providing the component with the state further comprising an unavailable state.

15. The method of claim 14, further comprising:

receiving a second image from the camera, wherein receiving the second image occurs while a system is currently engaged in the communication;

evaluating the second image to determine whether the second image comprises a second state update gesture associated with unavailability; and upon determining that the second image does comprise the second state update gesture associated with unavailability, perform a suspension action comprising one or more of muting audio provided by the system as a portion of the communication, suspending a video image provided by the system as a portion of the communication, or terminating the communication.

16. The method of claim 14, wherein a processor further performs:

receiving a third image from the camera, wherein receiving the third image occurs while a system is currently engaged in the communication while performing the suspension;

evaluating the third image to determine whether a second image comprises a third state update gesture associated with availability; and upon determining that the second image does comprise a second state update gesture associated with availability, perform a resumption action comprising one or more of unmuting audio provided by the system as a portion of the communication and resuming a video image provided by the system as the portion of the communication.

17. The method of claim 11, further comprising:

causing a system to selectively be excluded from receiving communications when the state is associated with unavailability, further comprising, declining the communication presented by the system to be answered; and causing the system to selectively be included to receive communications when the state is associated with availability, further comprising, answering the communication presented by the system to be answered.

18. A communication device, comprising:

a processor configured with machine-readable instructions maintained in a non-transitory storage;

a camera; and a network interface to a network; and wherein the processor performs:

receiving a first image from the camera;

evaluating the first image to determine whether the first image comprises a state update gesture made by a user; and upon determining that the first image comprises the state update gesture, setting a state of the communication device associated with the state update gesture to cause the communication device to identified as unavailable and selectively refuse a communication request or cause the communication device to be identified as available and accept the communication request.

19. The communication device of claim 18, wherein the processor performs the evaluating of the first image to determine whether the first image comprises the state update gestures, further comprising:

providing the first image to a neural network trained with a first training set comprising at least one set of state update gestures; and wherein the neural network determines the first image comprises a state update gesture upon determining the first image being determined to be more likely than not to match a threshold first image attribute learned from the at least one set of state update gestures.

20. The communication device of claim 19, wherein the neural network is trained with a second training set comprising the first training set and a set of non-state update gestures incorrectly identified as state update gestures during training the at least one set of state update gestures.

\* \* \* \* \*